Aug. 11, 1936.  C. MORROW  2,050,975
FREEZING MECHANISM
Filed June 25, 1931  4 Sheets-Sheet 2

INVENTOR.
Clifford Morrow
BY
Geo. B. Pitts
ATTORNEY.

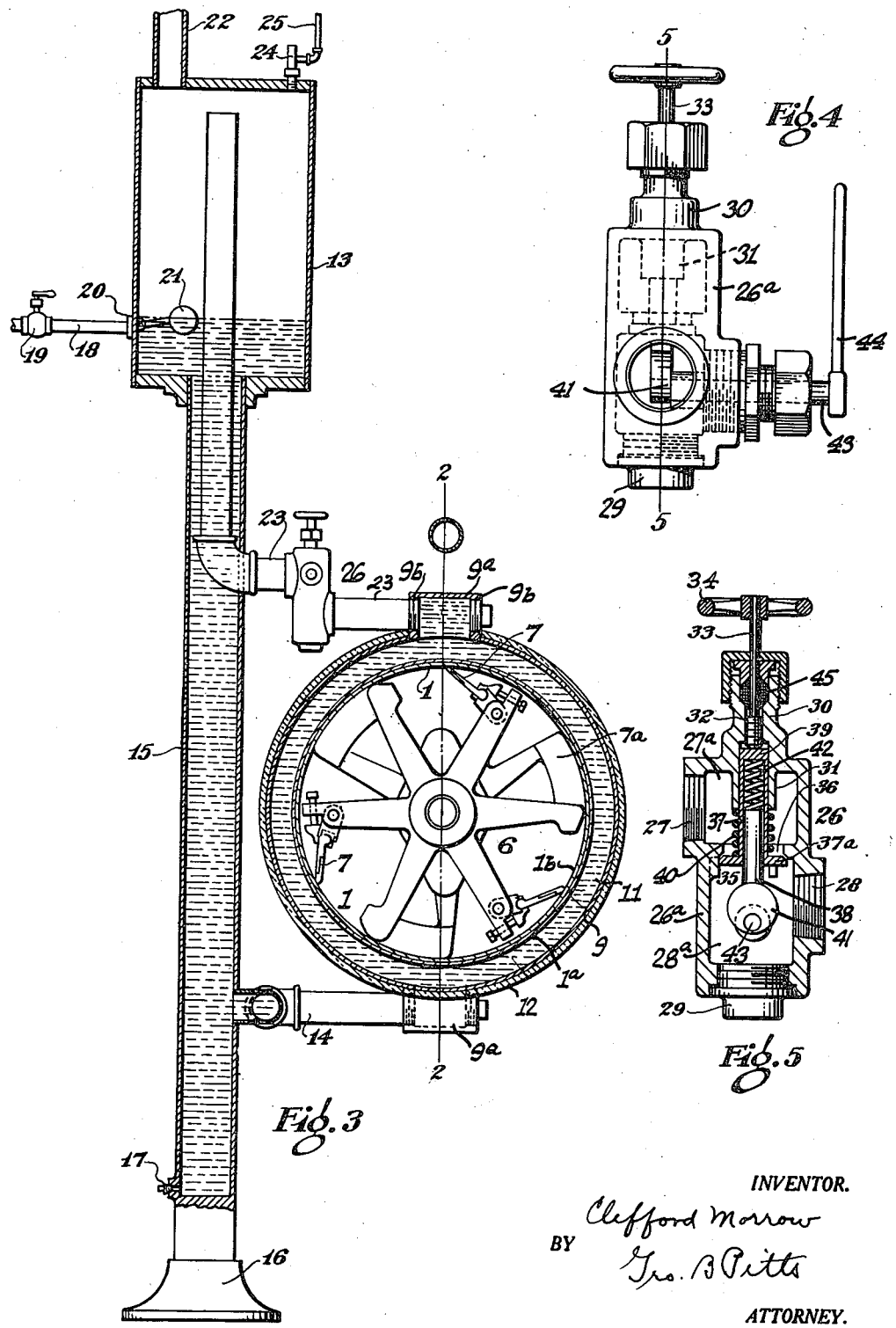

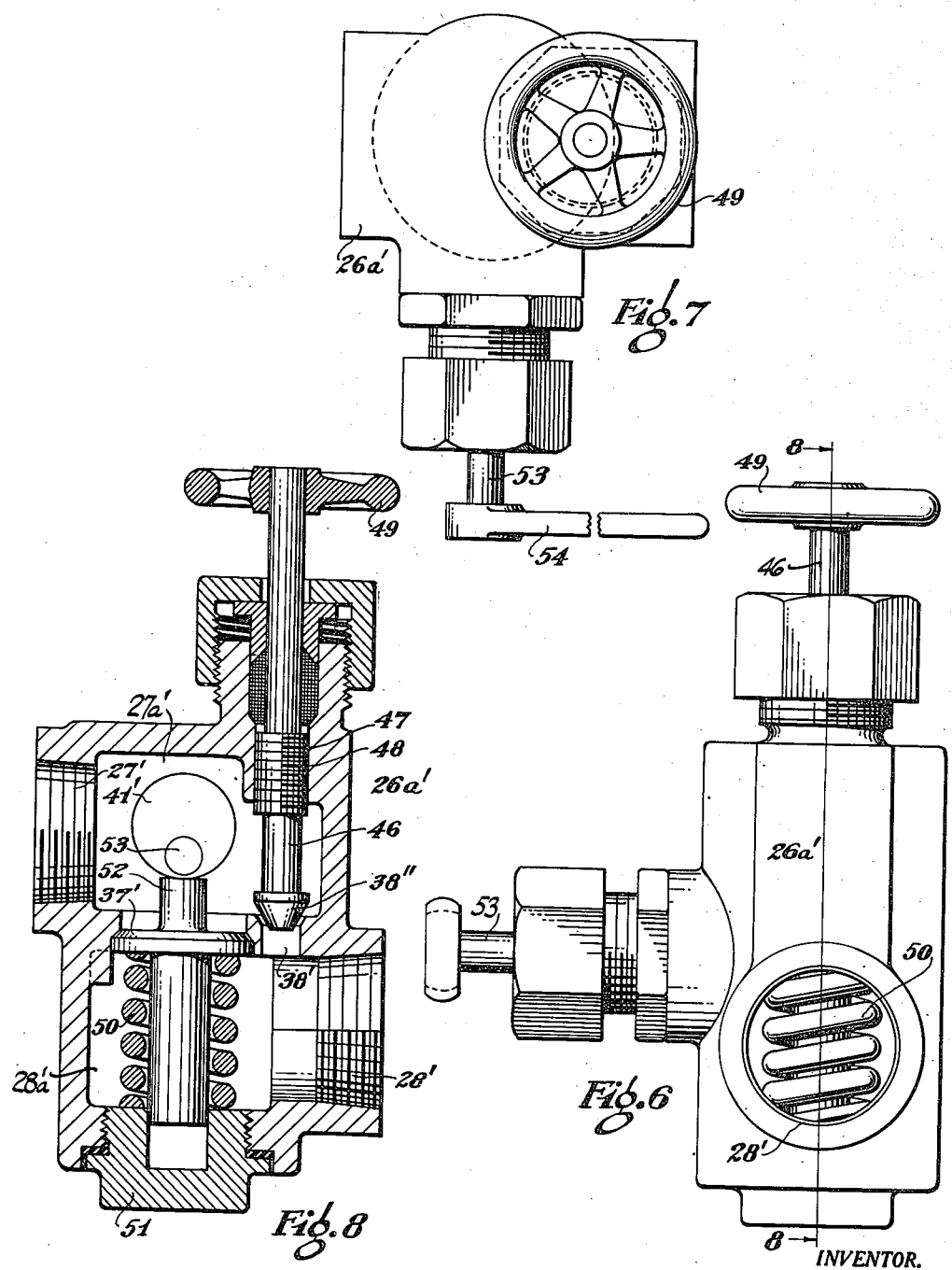

Patented Aug. 11, 1936

2,050,975

UNITED STATES PATENT OFFICE 2,050,975

FREEZING MECHANISM

Clifford Morrow, Canton, Ohio, assignor to The H. H. Miller Industries Company, Canton, Ohio, a corporation of Ohio Application June 25, 1931, Serial No. 546,689

1 Claim. (Cl. 62—114)

This invention relates to a freezing mechanism of the continuous batch type and process of controlling the refrigerant during freezing and whipping of each batch of material. The freezing mechanism is adapted to freeze cream and other materials, usually termed "mixes", whereby ice cream, ices and similar products may be produced.

One object of the invention is to provide an improved freezing mechanism in which ammonia in its liquid state is utilized as the refrigerant for freezing and whipping each batch of material.

Another object of the invention is to provide an improved valve mechanism adapted to control the supply of liquid ammonia for freezing the material and escape of gas resulting from the ammonia for maintaining substantially different predetermined temperatures during freezing and whipping of each batch of material.

Another object of the invention is to construct a dual control valve mechanism to provide different predetermined temperatures around the freezing cylinder, whereby freezing and whipping of each batch of material is positively controlled.

Another object of the invention is to provide an improved process of controlling the refrigerant for freezing batches of material, whereby successive batches may be frozen in minimum time.

Other objects of the invention will be apparent to those skilled in the art to which my invention relates from the following description taken in connection with the accompanying drawings, wherein Fig. 1 is a side elevation of a freezing mechanism embodying my invention, parts being broken away.

Fig. 3 is a section on the line 3—3 of Fig. 2.

Fig. 4 is an elevation of my improved valved mechanism.

Fig. 5 is a section on the line 5—5 of Fig. 4.

Fig. 6 is a side view of valve mechanism that is slightly different in construction from that shown in Figs. 1 to 5, inclusive.

Fig. 7 is a plan view of the parts shown in Fig. 6.

Fig. 8 is a section on the line 8—8 of Fig. 6.

Figure 1:
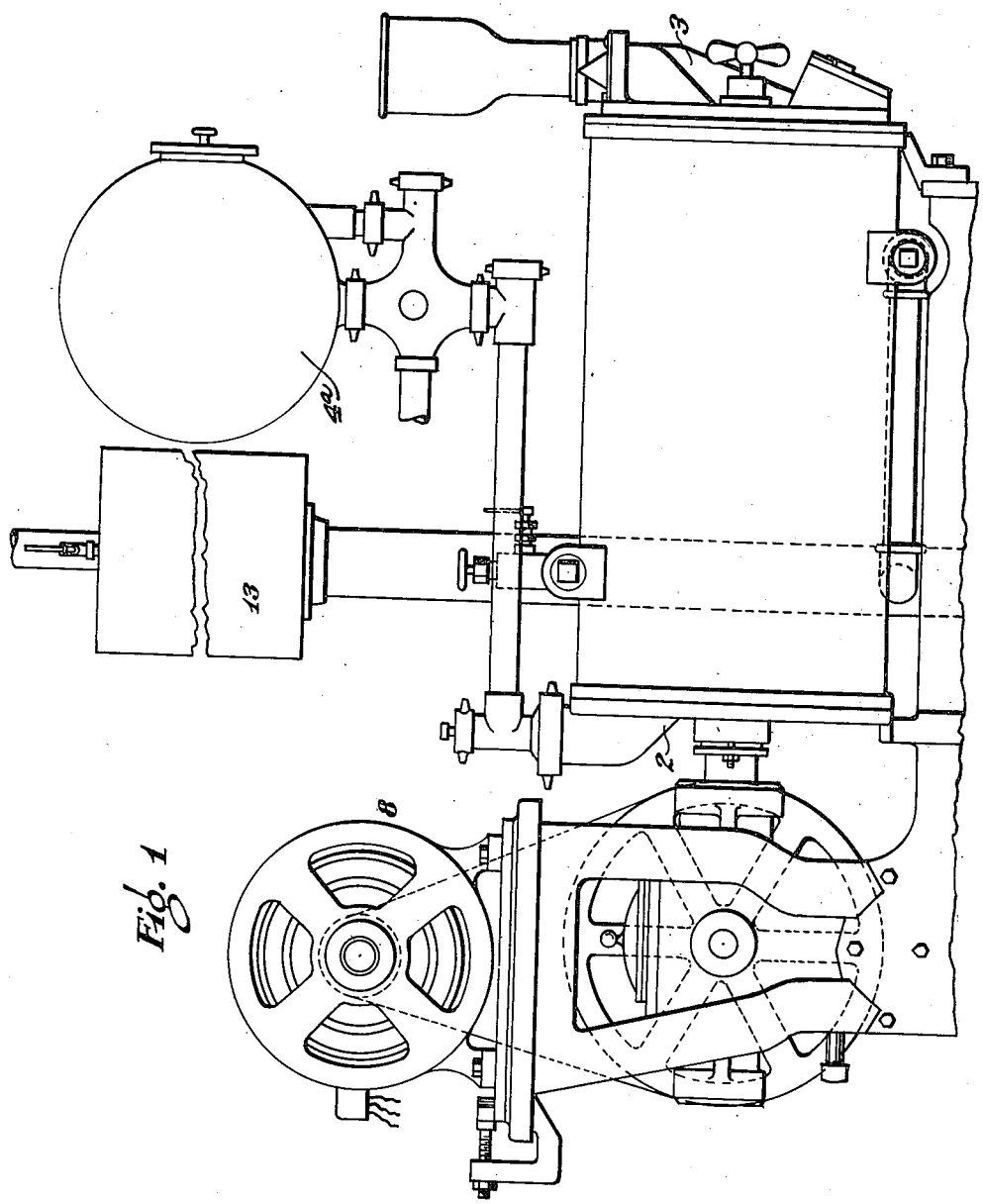

In the drawings, 1 indicates a cylinder in which each batch of material is frozen, the cylinder being closed by a rear head 2 and a removable front head 3. The rear head 2 is provided with a valved controlled supply pipe 4 leading from a measuring tank 4a. The front head 3 is provided with a valve controlled outlet 5. The head 3 may be constructed as shown in Letters Patent No. 1,449,623 granted to Leroy S. Pfouts. 6 indicates an agitating and ejecting mechanism within the cylinder 1 and preferably comprising inner and outer rotatable members, the outer member carrying suitable scrapers 7 and one or more ejecting elements 7a. The agitating and ejecting mechanism is preferably constructed substantially similar to that shown in Letters Patent No. 945,570 granted to John C. Miller. The rotatable agitating members are connected to two shafts, respectively, having concentric portions 6a, 6b, which extend through the rear head 2 and are driven in a well known manner by a suitable driving mechanism 8.

9 indicates a cylinder surrounding the cylinder 1, the space between the cylinders being closed at its rear and front ends by rings 10, thereby forming a chamber or space 11 for the liquid ammonia and gas generated therefrom. The outer wall of the cylinder 9 may be suitably insulated with a jacket of cork or other non-heat conducting material 12. By preference the cylinder 1 comprises a wall of steel 1a and a wall of nickel or an alloy containing nickel 1b rolled together in a well known manner and the cylinder 9 comprises a wall of steel, the rings 10 being welded thereto and the wall 1a.

13 indicates a reservoir and supply chamber for the liquid ammonia. 14 indicates a supply and discharge pipe leading from the bottom portion of the chamber 11 and connected to a stand pipe 15 which in turn is connected to the reservoir 13, whereby the liquid ammonia will be discharged from the cylinder space 11 into the latter and then returned to the space 11, as later set forth.

The standpipe 15 preferably comprises a tubular member closed at its lower end and fitted into a suitable base member 16. The pipe 14 is preferably connected to the standpipe at a point above its closed end, so that heavier ingredients such as oil may collect in the standpipe 15 below the pipe 14 and be drained out through a pet cock or removable plug 17. 18 indicates a pipe connected to the reservoir 13 and leading from a source of supply for supplying liquid ammonia thereto. The pipe 18 is provided with a manually operated valve 19 and a valve 20, which is automatically controlled by a float 21 in the reservoir, so that in the event the level of the ammonia falls below a certain level the valve 20 will open and supply liquid ammonia to maintain a predetermined quantity of ammonia in the system.

22 indicates a pipe leading from the upper end of the reservoir and connected to a suction creating mechanism such as the intake of a compressor (not shown).

23 indicates a suction pipe connected to the upper portion of the chamber or space 11 and extending into the reservoir 13, preferably to a point above the level of the liquid therein when the latter has been forced into the reservoir. The pipe 23 is preferably extended into the pipe 15 and then upwardly therethrough. The pipe 23 serves as a conduit for the vapor or gas given off by the ammonia due to the heat extracted from the material while being frozen, and whipped and also the excess gas in the space 11 at the end of the whipping operation.

The pipes 14 and 23 may be connected to the cylinder wall 9 in any suitable manner. Preferably, the wall 9 is formed with openings in each of which is mounted a fitting 9a having internally threaded openings in its end wall, as shown at 9b, the adjacent pipe (14 or 23) being threaded into one opening 9b and the other opening 9b being closed by a suitable plug.

26 indicates a valve mechanism adapted to control the flow of the liquid ammonia into the chamber 11 and out thereof, whereby maximum refrigerating conditions may prevail during freezing of the material to the desired temperature (approximately 25 degrees F) and restricted predetermined refrigerating conditions may prevail during the whipping operation. The valve mechanism 26 is so constructed that in one position it is fully opened and in its other position it is opened a restricted amount, whereby a predetermined degree of refrigeration is maintained around the cylinder 1 to prevent a rise in temperature of the frozen material for any reason.

Figure 2:
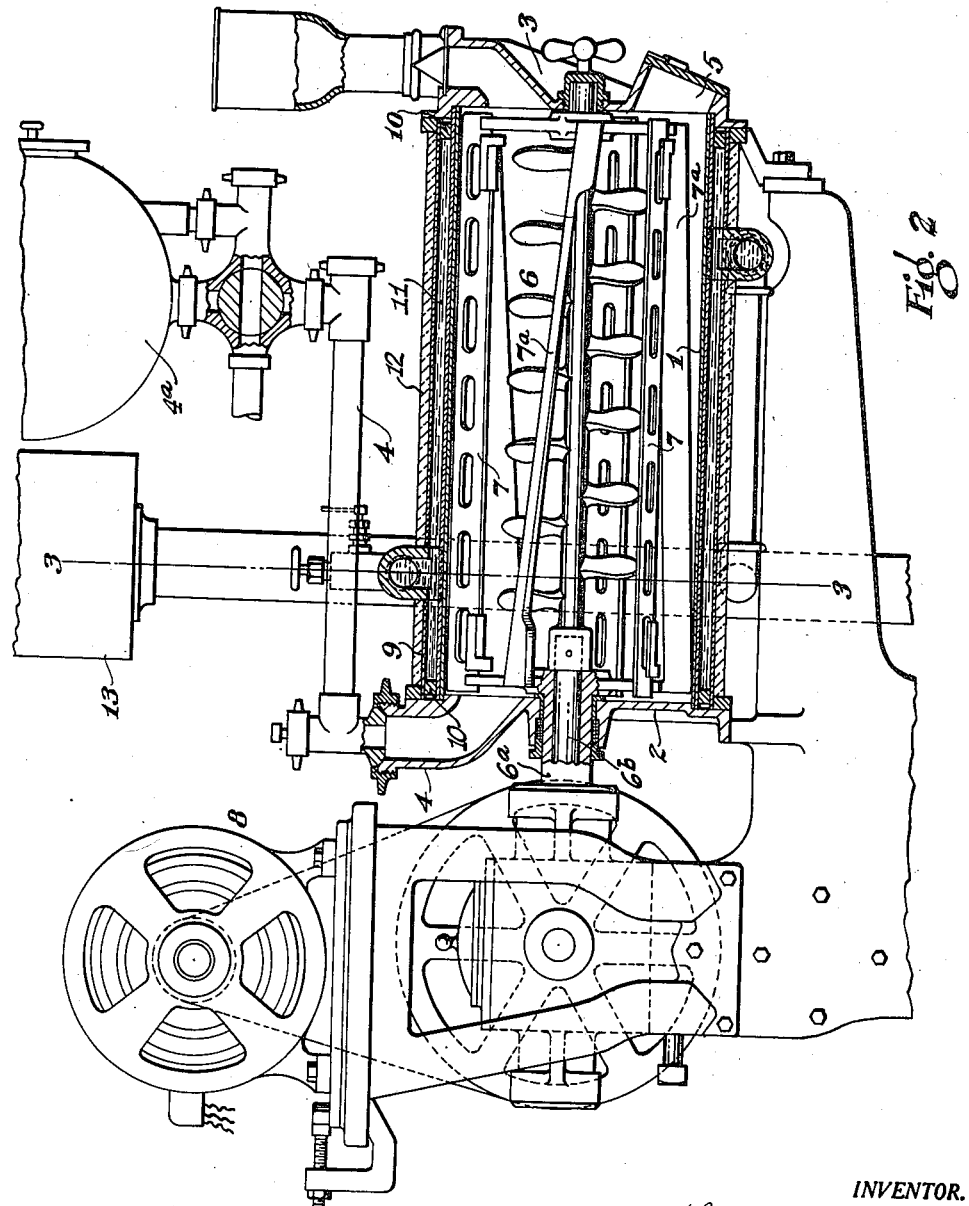
Fig. 2 is a view, partly in section on the line 2—2 of Fig. 3.

The valve mechanism 26 shown in Figs. 1 to 5, inclusive, comprises a compound valve element having dual controlling functions during operation of successive batches of "mix", but may be completely closed at the end of a day's run. In these views, 26a indicates a casing in which the adjacent ends of the pipe 23 are threaded. One end wall is closed by a removable plug 29. The opposite end wall of the casing 27 is provided with an external hollow boss 30 and an internal hollow boss 31, in axial, connected relation, the former being threaded internally to receive an adjustable abutment 32, having a shank 33, which carries a handle 34, whereby the abutment may be rotated to adjust its inner end inwardly or outwardly. The internal boss 31 forms a guide for a compound valve element 35. The casing 26a is shaped to form two chambers 27a, 28a, into which the openings 27, 28, lead, respectively, and between the chambers the walls of the casing are restricted to form an opening 36 with which the valve element co-acts to effect the dual functions already referred to, one face of the wall surrounding the opening 36 also serving as a valve seat when the valve is closed at the end of the day's run.

The valve element 35 consists of two telescoping members 37, 38, the outer or tubular member 37 being provided at its inner end with a flange 37a which co-acts with the walls of the opening 36 and closed at its outer end to provide a wall 39 to engage the abutment 32, which limits the movement of the flange 37a toward the opening 36 according to the adjustment of the abutment 32. An expansion spring 40 surrounds the member 37 and abuts against the free end of the boss 31 and the inner face of the flange 37a and normally tends to move the valve member 37 outwardly or in the direction to move the flange 37a away from the opening 36. The inner valve member 38 consists of a plunger slidably or telescopically fitting the tubular member 37 and engaging a cam 41. Between the inner end of the plunger 38 and end wall 39 is a compression spring 42, which is relatively stronger than the spring 40, so that when the cam 41 is rotated to the position shown in Fig. 5, the plunger 38 will act through the spring 42 to move the valve member 37 inwardly, against the tension of the spring 40, to one control position (see Fig. 5). When the cam is rotated 180 degrees, the spring 40 will move both valve members 37, 38, outwardly to the full open or other control position of the valve. At the end of the day's run, when it is desired to completely close the valve mechanism, the cam 41 is moved to the position shown in Fig. 5 and thereafter the abutment 32 is rotated to back it outwardly. The spring 42, which is under tension, will then move the valve member 37 inwardly relative to the valve member 38 and thus move the flange 37a into closing engagement with the wall of the opening 36. The cam 41 is secured to a shaft 43 rotatably mounted in and extending through the casing wall and provided with a handle 44 on its outer end. 45 is a gland for the shank of the abutment 32.

In Figs. 6, 7 and 8 I have shown a slightly different form of valve mechanism in which the controls of the liquid ammonia for freezing and whipping are effected by the co-operative relation of two valve elements mounted in a single casing and by the manipulation of a single valve.

In these views, 26a' indicates a casing having formed in its side walls threaded openings 27', 28', for the adjacent ends of the suction pipe 23, communicating with chambers 27a', 28a'. The internal walls of the casing 26a' are shaped to provide a valve opening having a valve seat for a valve element 37' and at one side of the valve opening the inner wall is formed with a port 38' with which a control member 38'' co-acts to restrict the escape of gas, as later set forth, whereby a predetermination degree of refrigeration may be provided for in the space 11 during whipping of the material. The inner end of the port 38' is of conical shape and the member 38'' is of similar shape, whereby these parts may serve as a valve when the run of freezing operations is completed. The control member 38'' is mounted on the inner end of a shank 46, which has a threaded portion 47, fitted into and through a threaded opening 48 formed in the casing wall, whereby the member 38'' may be adjusted to vary the escape of gas through the opening 38', or entirely closed. The outer end of the shank 46 is provided with a handle 49. The member 38'' is shown in the adjusted position which it occupies during the day's run of freezing operations, unless it is found desirable to vary the escape of gas.

The valve element 37' is normally operated against its seat by a spring 50, surrounding the shank of the valve element 37' and bearing against a removable plug 51, which has a recess to receive and guide the outer end of the shank. The inner face of the valve element is provided with a thrust element 52 with which a cam 41' engages to effect movement of the valve element 37', the cam being fixed to a shaft 53 having an operating handle 54.

The operation of the freezer mechanism is as follows: assuming that the valve mechanism 26 is completely closed and a supply of liquid ammonia is in the receiver 13. I first admit a batch of the "mix" into the cylinder 1 and start the driving mechanism. I then operate the cam 41 a half revolution to open the valve mechanism 26, that is, I move the valve member 37 to its full open position, which relieves the space 11 of any gas that has accumulated therein and permits the liquid ammonia to gravitate downward and flood the space 11. The freezing then commences, and while this operation is taking place I adjust the abutment 32 to its operating position as shown in Fig. 5. At the end of the freezing operation, I rotate the cam 41 to its first position, which moves the valve member 37 into engagement with the abutment 32, which maintains the valve element in its other control position. In this control position, gas will accumulate in the space 11 and force the larger portion of the liquid ammonia out of the space 11 into the receiver 13; however, due to the escape provided for by the valve element in this control position, a sufficient quantity of liquid ammonia will remain in the space 11 to provide limited refrigeration for the material during whipping thereof and discharge of the material from the cylinder 1. When the material is discharged, a new batch is admitted to the cylinder 1 and the valve member 37 is then moved to its open or other control position, thus allowing the accumulated gas in the space 11 to escape and the liquid ammonia to flow thereinto.

In my construction, I provide dual control valve mechanism in a single casing and control of the liquid ammonia for both operations of freezing and whipping of the material is effected by the operation of a single handle.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

In a freezing mechanism, the combination of inner and outer members, said outer member surrounding and spaced from the walls of said inner member, said inner member consisting of a cylinder formed of pre-rolled together materials, the material for the inner surface of said cylinder being non-corrosive, heads for the opposite ends of said cylinder, one of said heads being formed with an inlet and one thereof being formed with a valved outlet, means for closing the space between said members at the ends thereof, and material agitating means within said cylinder.

CLIFFORD MORROW.